United States Patent Office 3,281,668
Patented Oct. 25, 1966

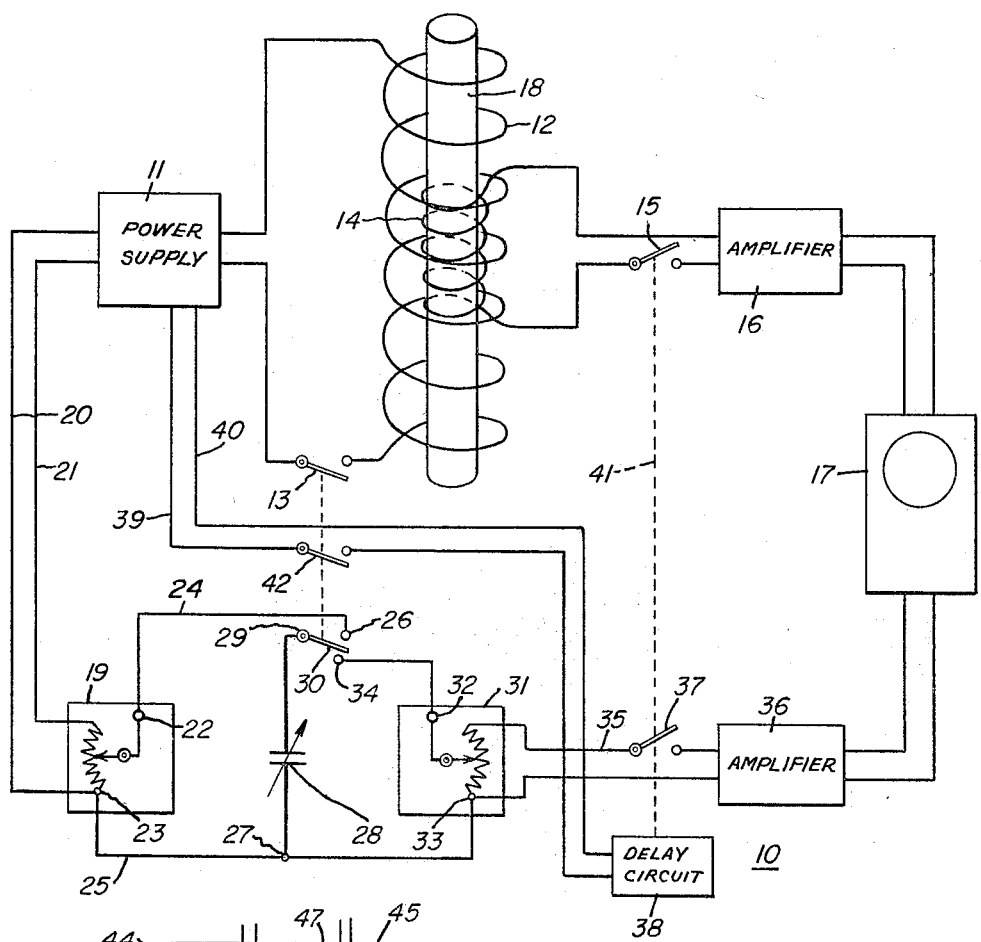
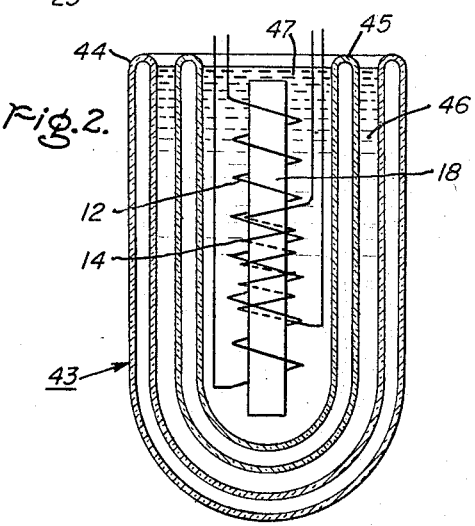

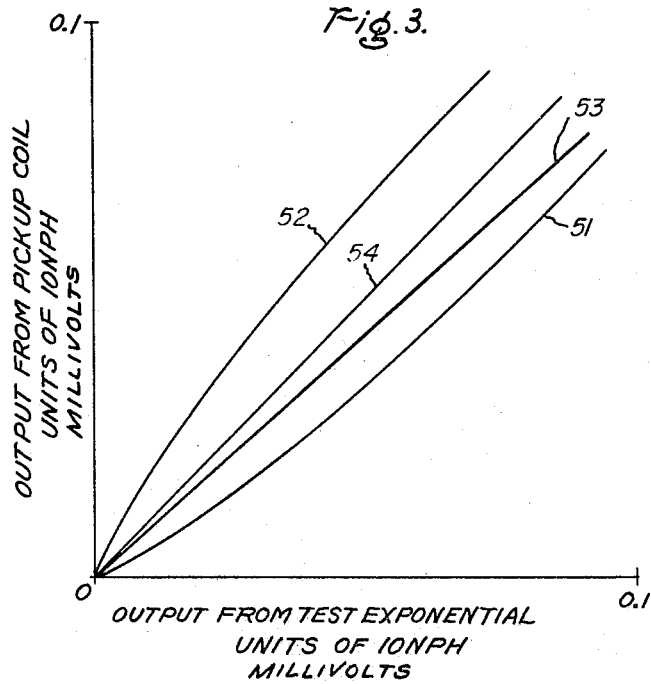
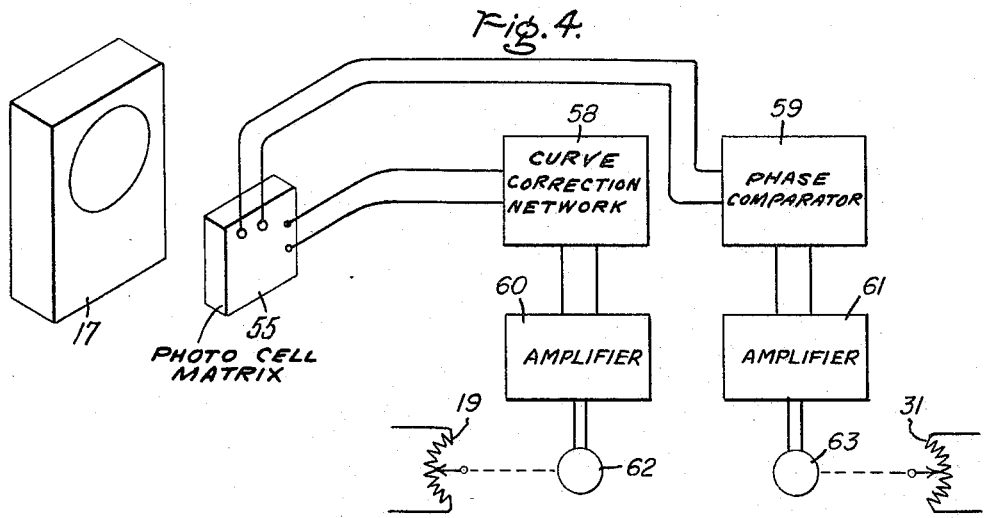

3,281,668
APPARATUS FOR DETERMINING ELECTRICAL PROPERTIES OF METAL, SUCH AS ITS RESISTIVITY AND UTILIZING MEASUREMENTS MADE AT HIGH AND AT LOW TEMPERATURES
Carl H. Rosner and Charles P. Bean, Schenectady, N.Y., assignors to General Electric Company, a corporation of New York
Filed Nov. 30, 1962, Ser. No. 241,376
3 Claims. (Cl. 324—40)

This invention relates to apparatus for determining electrical properties of metallic members of both uniform and non-uniform dimensions and more particularly to apparatus for determining directly the resistivity, the resistivity ratio or resistance ratio of metallic members of uniform dimensions or the resistance ratio of metallic members of non-uniform dimensions.

Present conventional room temperature resistivity measurement methods include applying leads to a uniformly thick metallic member, passing a direct current through the member, and measuring the resistance by instrument. The resistivity is then calculated since the dimensions of the member are known. An alternating magnetic field has also been employed to a uniformly thick metallic member at room temperature to measure its resistance. However, this measurement, from which a resistivity value is calculated subsequently, provides only the skin resistance of the member. Eddy-current measurements have been employed at room temperature to determine the permeability-conductivity product or either conductivity or permeability if the other is known.

Low resistivity of pure metals of uniform dimensions at very low temperatures, such as temperatures substantially below 273° K., makes conventional resistivity measurements difficult and subject to a high degree of error unless the metallic member is in the form of a long, thin wire of uniform dimensions. At these very low temperatures, the resistivity of a metallic member of uniform dimensions is generally proportional to purity, in order of magnitude; 1 percent of impurity corresponds approximately to a resistance of $1 \times 10^{-6}$ ohm-centimeter or 1 micro-ohm-centimeter. The ratio of the resistance or resistivity of the metal which is measured at a temperature of about 273° K. and at a temperature substantially below 273° K. is also proportional to purity. A ratio of 1 is proportional to a purity of 99.0%. Ratios of 10; 100; 1000; 10,000; and 100,000 are proportional to purities of 99.9%, 99.99%, 99.999%, 99.9999% and 99.99999%, respectively. Thus, resistivity determinations at low temperatures, resistance ratios or resistivity ratios would be desirable quantities for determining the purity of metallic members of uniform dimension. Such determinations or ratios would have application in operations such as zone-refining and copper dip-forming of rod stock.

It would be advantageous to eliminate damage or contamination caused by affixing leads to the member as is presently done. It would be further desirable to obtain local or segmented resistivity values rather than an average value for the member of uniform dimensions and to obtain local or segmented resistance ratios for non-uniform dimensional metallic members. It would also be desirable to determine the resistance ratio of unconventionally shaped metallic members.

In copending application Serial No. 71,969, filed November 28, 1961, now Patent No. 3,234,458, a method of determining resistivity of a metal at a low temperature below 77° K. is disclosed and claimed which comprises determining the time of decay of eddy-current in a metal member subjected to an abrupt change of magnetic field at a temperature above 77° K., subjecting the metal member to an abrupt change of magnetic field at a temperature below 77° K., measuring the time of decay of the voltage induced by the changing eddy-currents, determining a ratio from the voltage decay times, and multiplying the ratio by the known resistivity value of the metal at the temperature above 77° K. The present invention provides an improved apparatus for direct determination of the resistivity of a metal at both room temperature and at a temperature substantially below 273° K.

It is an object of our invention to provide apparatus for determining directly the resistivity of a metallic member of uniform dimensions at a temperature substantially below 273° K.

It is another object of our invention to provide apparatus for determining the resistance ratio or resistivity ratio of a metallic member of uniform dimensions.

It is another object of our invention to provide apparatus for determining the resistance ratio of a metallic member of non-uniform dimensions.

It is a further object of our invention to provide apparatus for determining directly segmented or local resistivity values of a metallic member of uniform dimensions at a temperature substantially below 273° K.

It is a still further object of our invention to provide apparatus for determining directly the resistance ratio or resistivity ratio of a segment of a metallic member of uniform dimensions.

It is still a further object of our invention to provide apparatus for determining the resistance ratio of a segment of a metallic member of non-uniform dimensions.

In carrying out our invention in one form, apparatus comprises a power supply, a first circuit connected to said power supply, means to actuate the first circuit thereby generating a magnetic field in said first circuit with resulting flux penetration of a metal member adapted to be positioned within the magnetic field and adapted to be tested, a second circuit positioned within the magnetic field generated by the first circuit thereby receiving an induced voltage from the metal member adapted to be positioned within said magnetic field and magnetically coupled with said metal member, means to reduce the temperature of the first and second circuits to a temperature substantially below 273° K., means to actuate the second circuit, one set of deflection plates of a recorder connected to the second circuit; a variable resistance device connected to the power supply, a variable energy storage device connected across the resistance device, a second variable resistance device connected to the energy storage device, means to actuate and to discharge the energy storage device, a third circuit connecting the other set of deflection plates of the recorder to the second resistance device, means to actuate the third circuit; a delay circuit coupled to the second circuit actuation means and the third circuit actuation means, and means to actuate the delay circuit, the last means coupled to the first circuit actuation means, the energy storage device actuation means, and the energy storage device discharge means.

These and various other objects, features, and advantages of the invention will be better understood from the following description taken in connection with the accompanying drawing in which:

FIGURE 1 is a schematic view of a portion of apparatus embodying our invention;

FIGURE 2 is a sectional view of a further portion of apparatus embodying our invention;

FIGURE 3 is a graph plotting voltage output from a pickup coil versus a second voltage output in the apparatus shown in FIGURES 1 and 2; and FIGURE 4 is a schematic view of further apparatus for providing an automatic measurement.

In FIGURE 1 of the drawing, apparatus is shown generally at 10 for determining electrical properties of a metallic member. A power source, such as a battery 11, is connected to a first circuit 12 in the form of a coil to provide a magnetic field. A switch 13 is associated with circuit 12 to actuate this circuit. A second circuit 14 in the form of a pickup coil is associated with the first circuit 12. A second switch 15 is associated with second circuit 14 to actuate this circuit. Second circuit 14 is connected to an amplifier 16 which is connected to the vertical deflection plates of a recorder 17, such as an oscilloscope. If a sufficient number of turns are provided in the coils of the first and second circuits, amplifier 16 is not necessary to produce an amplified signal to recorder 17. A metallic member 18, such as an aluminum rod of uniform dimensions is inserted within circuits 12 and 14 to determine its resistance ratio, resistivity ratio or resistivity. If the member is of nonuniform dimensions, its resistance ratio is determined.

A first variable resistance device 19 for varying voltage magnitude, such as a potentiometer is connected to power source 11 by means of leads 20 and 21. A pair of terminals 22 and 23 of device 19 are connected by leads 24 and 25 to terminals 26 and 27. A variable energy storage device 28 in the form of a variable capacitor is connected to a pair of terminals 27 and 29. Terminal 29 carries a third switch 30 which is adapted to contact terminal 26 to actuate device 28. A second variable resistance device 31 for varying the voltage time constant has a pair of terminals 32 and 33. Terminal 32 is connected to a terminal 34 which is also contacted by third switch 30 to discharge electrical energy from device 28 to device 31. Terminal 33 is connected to terminal 27. A third circuit 35 connects device 31 to an amplifier 36 which is connected to the horizontal deflection plates of recorder 17. A fourth switch 37 is associated with third circuit 35 to actuate the circuit.

A delay circuit 38, which is connected to power supply 11 by leads 39 and 40, is coupled to second switch 15 and fourth switch 37 as shown by dotted lines 41. A fifth switch 42, which is provided to actuate delay circuit 38, is coupled to first switch 13 and third switch 30.

In FIGURE 2 of the drawing, a portion of apparatus is shown for reducing the temperature of circuits 12 and 14 to a temperature substantially below 273° K. Rod 18 is shown positioned within the coils of circuits 12 and 14 which are connected to the apparatus as shown in FIGURE 1. An insulated container 43 comprises an outer insulated vessel 44 and an inner insulated vessel 45 separated by liquid nitrogen 46. Liquid helium 47, which is contained within inner vessel 45 surrounds rod 18 and its associated circuits 12 and 14.

We discovered that an apparatus could be constructed to determine directly electrical properties of metallic members of both uniform and non-uniform dimensions. Such apparatus comprises a first circuit adapted to be connected to a power supply and to provide a magnetic field, means to actuate the first circuit, a second circuit associated with the first circuit, means to reduce the temperature of the first and second circuits to a temperature substantially below 273° K., means to actuate the second circuit, one axis of a recorder connected to the second circuit; a variable resistance device adapted to be connected to the power supply, a variable energy storage device connected to the resistance device, means to actuate the energy storage device, a second variable resistance device connected to the energy storage device, means to discharge the energy storage device to the second resistance device, a third circuit connecting the other axis of the recorder to the second resistance device, means to actuate the third circuit; a delay circuit coupled to the second circuit actuation means and the third circuit actuation means, and means to actuate the delay circuit, the last means coupled to the first circuit actuation means, the energy storage device actuation means, and the energy storage device discharge means.

We discovered that such apparatus would determine directly the resistivity of a metallic member of uniform dimensions at a temperature substantially below 273° K. This apparatus will also determine directly the resistivity ratio or resistance ratio of such a metallic member. The resistance ratio of a metallic member of non-uniform dimensions is also obtained. Furthermore, local or segmented determinations are made directly.

In one mode of operation of the apparatus shown in FIGURES 1 and 2 of the drawing, an aluminum rod 18 of uniform dimensions is positioned within circuits 12 and 14 to determine its resistance ratio directly. A unidirectional current is passed from power supply 11 through circuit 12. The current is passed for a sufficient time for essentially complete flux penetration of metallic member 18. The current is then interrupted by opening switch 13 to subject member 18 to an abrupt change of the magnetic field to induce a voltage in circuit 14. This operation is repeated to generate a plurality of sequential magnetic fields and induced voltages. Switch 15 of circuit 14 is open for a brief time interval after each induced voltage in circuit 14 thereby delaying transmission of each voltage resulting in retention of only a later portion of the voltage. Switch 15 is then closed by delay circuit 38, which will be described below, to transmit the voltage portion to an amplifier 16. After amplification, the voltage portion is recorded on one axis of recorder 17. In this manner, a plurality of sequential voltage portions are recorded on one axis of the recorder. If a sufficient number of turns are provided for circuits 12 and 14, the amplification is not required.

A unidirectional current is passed also from power source 11 through leads 20 and 21 to a first resistance device 19 for varying voltage magnitude. This second voltage from device 19 is supplied by leads 24 and 25 to an energy storage device 28. Switch 30, which contacts terminal 26 of lead 24, is operable with switch 13 in circuit 12. When switch 13 is closed, switch 30 is closed to supply the second voltage to energy storage device 28. Upon opening switch 13 in circuit 12 to subject member 18 to an abrupt change in magnetic field, switch 30 moves from terminal 26 to terminal 34 to discharge the current to device 31 which is adapted to vary the voltage time constant. Switch 37 of circuit 35, which connects device 31 to amplifier 36, is open for a brief time interval thereby delaying transmission of each of the second voltages resulting in retention of only a later portion of this voltage. Switch 37 is then closed to supply the second voltage portion to amplifier 36. After amplification of each second voltage portion to the same degree of amplification as the corresponding first voltage portion, the second voltage portion is recorded on the other axis of recorder 17.

Energy storage device 28 is set initially or during recordation of the voltage portions to a constant value. Second resistance device 31 is adjusted to produce a linear relationship between each of the first voltage portions and each of the second voltage portions on recorder 17. Device 31 varies the voltage time constant which equals the capacitance multiplied by the resistance of device 31. Resistance device 19 is then adjusted to establish a 45 degree angle between the linear relationship and an axis of recorder 17. The dial of device 31 is calibrated in ohms whereby the resistance of member 18 is measured directly at a temperature above 273° K., such as, for example, room temperature.

Member 18 with associated circuits 12 and 14 is immersed in liquid helium 47 within insulated container 43 to subject member 18 to a temperature substantially below 273° K. The apparatus is continued in operation as described above to record the linear relationship of the voltage portions on recorder 17. Resistance device 31 is adjusted again to produce a linear relationship between each of the first voltage portions and each of the second voltage portions on recorder 17. In this manner, device 31 determines directly the resistance of member 18 at a temperature substantially below 273° K. The resistances at these temperatures provide a ratio which is the resistance ratio or the resistivity ratio of member 18. Device 31 can be calibrated in both ohms for resistance measurement and in fractions for ratio measurement whereby the adjustment at low temperature provides a direct resistance reading and a direct resistance ratio reading. The dial of device 31 can also be calibrated in purity percentage to provide a direct determination thereof at the low temperature.

As described above, the resistance, resistance ratio, and purity percentage can be determined directly by apparatus 10. Additionally, this apparatus can be employed in a similar manner to determine the resistivity or resistivity ratio of such a member. For example, the resistance of rod 18 is determined on the dial of device 31 at room temperature. Since the dimensions of the rod are known, its resistivity is calculated and the dial calibrated with resistivity values. If desired, resistivity ratios are also calibrated on the same dial. When device 31 is adjusted during low temperature operation, its resistivity or resistivity ratio or both values are determined directly by device 31. As it was described above, purity percentage can also be calibrated on the dial of device 31.

When a metallic member of non-uniform dimensions is employed in apparatus 10, the resistance, resistance ratio and purity percentage can be calibrated on the dial of device. The operation of the apparatus is otherwise identical as described above.

In FIGURE 3 of the drawing, a graph is shown which plots voltage output from the pickup coil 14 versus a second voltage output from circuit 35 in the apparatus shown in FIGURE 1. A line 51 represents a non-linear relationship which is produced by the recording of a plurality of first voltage portions and second voltage portions at a temperature above 273° K. on recorder 17 shown in FIGURE 1. Line 51 discloses the time constant lowered by 10 percent from the correct time constant. A line 52 represents a similar non-linear relationship which is raised 10 percent above the correct time constant. After resistance device 31 is adjusted to vary the time constant, a linear relationship between each of the first voltage portions and each of the second voltage portions is established which is represented by line 53. However, it is noted that line 53 does not establish a 45 degree angle between this linear relationship and an axis of the recorder. After resistance device 19 is adjusted, a line 54 is established which has a 45 degree angle relationship with an axis of recorder 17. As described above, the resistance ratio is determined directly by visual observation of the calibrated dial on device 31.

In FIGURE 4 of the drawing, there is shown apparatus for providing an automatic measurement of member 18. A photocell matrix 55 is positioned to view the response displayed on recorder 17 of the apparatus shown in FIGURE 1. A curve correction network 58 and a phase comparator 59 are connected to photocell matrix 55. Amplifiers 60 and 61 are connected to network 58 and comparator 59, respectively. Servo-motors 62 and 63 are connected to respective amplifiers 60 and 61. Motor 62 is connected to first resistance device 19 to vary the voltage magnitude. Motor 63 is connected to second resistance device 31 to vary the voltage time constant.

In the operation of the apparatus disclosed in FIGURE 4, a line such as line 51 in FIGURE 3 is produced on recorder 17 by the recording of a plurality of first voltage portions and second voltage portions thereon. Line 51 is transmitted to photocell matrix 55. The output from matrix 55 is furnished to phase comparator 59 to match the non-linear relationship of line 51 with the correct linear relationship established in phase comparator 59. The output from comparator 59 is amplified by amplifier 61 and the amplified signal therefrom is fed to servo-motor 63. This motor, which is connected to resistance device 31 varies the voltage time constant to produce a linear relationship between each of the first voltage portions and each of the second voltage portions. A line such as line 53 in FIGURE 3 is then represented on recorder 17.

Line 53 is fed to matrix 55 which transmits the characteristics of line 53 to network 58. The angular relationship of line 53 with an axis of recorder 17 is matched against a 45 degree angular relationship in network 58. An output signal is generated from network 58, amplified in amplifier 60 and fed to servo-motor 62. Motor 62, which is connected to device 19, varies the voltage magnitude to establish a 45 degree angle between the linear relationship and an axis of the recorder. Line 54 in FIGURE 3 represents a linear relationship between the output of each of the first voltage portions and each of the second voltage portions which are at a 45 degree angle with an axis of recorder 17. The resistance ratio of member 18 is determined directly by visual observation of the calibrated dial on resistance device 31.

Several examples of methods of determining directly the electrical properties of a metallic member in accordance with the present invention are as follows:

Apparatus was set up in accordance with FIGURES 1 and 2 of the drawing. Metallic members in the form of rods of copper, niobium and tin were each positioned separately within the first and second circuits at a temperature of about 300° K. A unidirectional current of approximately 2 amperes was passed from a 6 ampere, 12 volt variable power supply through the first circuit. The current was passed for a sufficient time for essentially complete flux penetration of the rod. The current was then interrupted by opening the first switch to subject the rod to an abrupt change of the magnetic field to induce a voltage in the second circuit. This operation was repeted to generate a plurality of sequential magnetic fields and induced voltages. The second switch positioned in the second circuit was open for a brief time interval after each induced voltage in the first circuit thereby delaying transmission of each voltage resulting in retention of only a later portion of the voltage. The second switch was then closed by a delay circuit to transmit the voltage portion to an amplifier. After amplification, the voltage portion was recorded on one axis of a recorder. In this manner, a plurality of sequential voltage portions were recorded on one axis of the recorder.

An equivalent unidirectional current was passed also from the power supply through a pair of leads to a first resistance device for varying voltage magnitude. This second voltage from the first resistance device was supplied by leads to an energy storage device. A third switch, which contacted a terminal of the lead from the first resistance device, was operable with the first switch in the primary circuit. When the first switch was closed, the third switch was closed to supply the second voltage to the energy storage device. Upon opening the first switch in the primary circuit to subject the rod to an abrupt change in magnetic field, the third switch moved to a terminal of a second resistance device to discharge the current to such device which was adapted to vary the voltage time constant. A fourth switch in a circuit which connects the second resistance device to a second amplifier was open for a brief time interval thereby delaying transmission of each of the second voltages resulting in retention of only a later portion of this voltage. The fourth switch was then closed to supply the second voltage portion to the second amplifier. After amplification of each second voltage portion to the same degree of amplification as the corresponding first voltage portion, the second voltage portion was recorded on the other axis of the recorder.

The energy storage device was set initially at a constant value of 0.01 microfarad, 0.001 microfarad, and 0.01 microfarad for the respective rods. The second resistance device was adjusted to produce a linear relationship between each of the first voltage portions and each of the second voltage portions on the recorder. The second resistance device varies the voltage time constant which equals the capacitance multiplied by the resistance of this device. The first resistance device is then adjusted to establish a 45 degree angle between the linear relationship and an axis of the recorder. The dial of the second resistance device recorded a resistance of 2400 ohms, 2550 ohms and 1980 ohms for the respective rods of copper, niobium and tin.

Each of the above rods and its associated first and second circuits were immersed separately in liquid helium within an insulated container to subject each rod to a temperature substantially below 273° K. The copper, niobium and tin rods were subjected to temperatures of 4.2° K., 20.4° K. and 4.2° K., respectively. The apparatus was continued in operation as described above to record the linear relationship of the voltage portions on the recorder. The second resistance device was adjusted again to produce a linear relationship between each of the first voltage portions and each of the second voltage portions on recorder 17. The dial of the second resistance device recorded a resistance of $3.36 \times 10^6$ ohms, $1.04 \times 10^6$ ohms and $1.38 \times 10^6$ ohms for the respective rods. The same setting for the energy storage device was maintained. Ratios of 1400; 40 and 7000 resulted from above measurements of the copper, niobium and tin rods, which ratios are the resistivity ratios and resistance ratios of these rods. These ratios are proportional to purity percentages of 99.999+ percent, 99.9+ percent and 99.9995+ percent for the respective rods.

While other modifications of this invention and variations thereof which may be employed within the scope of the invention have not been described, the invention is intended to include such that may be embraced within the following claims.

What we claim as new and desire to secure by Letters Patent of the United States is:

1. Apparatus comprising a power supply, a first circuit connected to said power supply, means to actuate said first circuit thereby generating a magnetic field in said first circuit with resulting flux penetration of a metal member adapted to be positioned within a magnetic field and adapted to be tested, a second circuit positioned within the magnetic field generated by said first circuit thereby receiving an induced voltage from the metal member adapted to be positioned within said magnetic field and magnetically coupled with said metal member, means to reduce the temperature of said first and second circuits to a temperature substantially below 273° K., means to actuate said second circuit; one set of deflection plates of a recorder connected to said second circuit; a first variable resistance device connected to said power supply, a variable energy storage device adapted to be connected across said resistance device, a second variable resistance device calibrated in terms of the electrical properties of said metal member and adapted to be connected to said energy storage device, actuation means alternately connecting said energy storage device to said first variable resistance device and to said second variable resistance device to alternately charge and discharge said energy storage device, said last means coupled with said means to actuate said first circuit, a third circuit connecting the other set of deflection plates of said recorder to said second resistance device, means to actuate said third circuit; a delay circuit coupled to said second circuit actuation means and said third circuit actuation means, and means to actuate said delay circuit, said last means coupled to sad first circuit actuation means and to said energy storage device actuation means.

2. Apparatus comprising a power supply, a first coil connected to said power supply, a first switch to actuate said coil thereby generating a magnetic field in said first coil with resulting flux penetration of a metal member adapted to be positioned within the magnetic field and adapted to be tested, a pickup coil positioned within the magnetic field generated by said first coil thereby receiving an induced voltage from the metal member adapted to be positioned within said magnetic field and magnetically coupled with said metal member, means to reduce the temperature of said first coil and said pickup coil to a temperature substantially below 273° K., a second switch to actuate said pickup coil, one set of deflection plates of a recorder connected to said pickup coil; a first potentiometer connected across said power supply, a variable capacitor adapted to be connected to said potentiometer, a second potentiometer calibrated in terms of the electrical properties of said metal member and adapted to be connected to said capacitor, a third switch alternately connecting said capacitor to said first potentiometer and to said second potentiometer to alternately charge and discharge said capacitor, said third switch coupled to said first switch, the other set of deflection plates of said recorder connected to said second potentiometer, a fourth switch between said recorder and said second potentiometer; a delay circuit coupled to said second and said fourth switches, a fifth switch to actuate said delay circuit, said fifth switch coupled to said first and third switches.

3. Apparatus comprising a power supply, a first circuit connected to said power supply, means to actuate said first circuit thereby generating a magnetic field in said first circuit with resulting flux penetration of a metal member adapted to be positioned within the magnetic field and adapted to be tested, a second circuit positioned within the magnetic field generated by said first circuit thereby receiving an induced voltage from the metal member adapted to be positioned within said magnetic field and magnetically coupled with said metal member, means to actuate said second circuit, one set of deflection plates of a recorder connected to said second circuit; a first variable resistance device connected across said power supply, a variable energy storage device adapted to be connected to said resistance device, a second variable resistance device calibrated in terms of the electrical properties of said metal member and adapted to be connected to said energy storage device, actuation means alternately connecting said energy storage device to said first variable resistance device and to said second variable device to alternately charge and discharge said energy storage device, said last means coupled to said means to actuate said first circuit, a third circuit connecting the other set of deflection plates of said recorder to said second resistance device, means to actuate said third circuit; a delay circuit coupled to said second circuit actuation means, and said third circuit actuation means, and means to actuate said delay circuit, said last means coupled to said first circuit actuation means and to said energy storage device actuation means.

No references cited.

WALTER L. CARLSON, *Primary Examiner.*

RICHARD B. WILKINSON, *Examiner.*

F. A. SEEMAR, R. J. CORCORAN, *Assistant Examiners.*